May 27, 1969 H. W. DEATON 3,447,007
TRANSISTORIZED ELECTRICAL CONTROL CIRCUIT
Filed Dec. 2, 1965
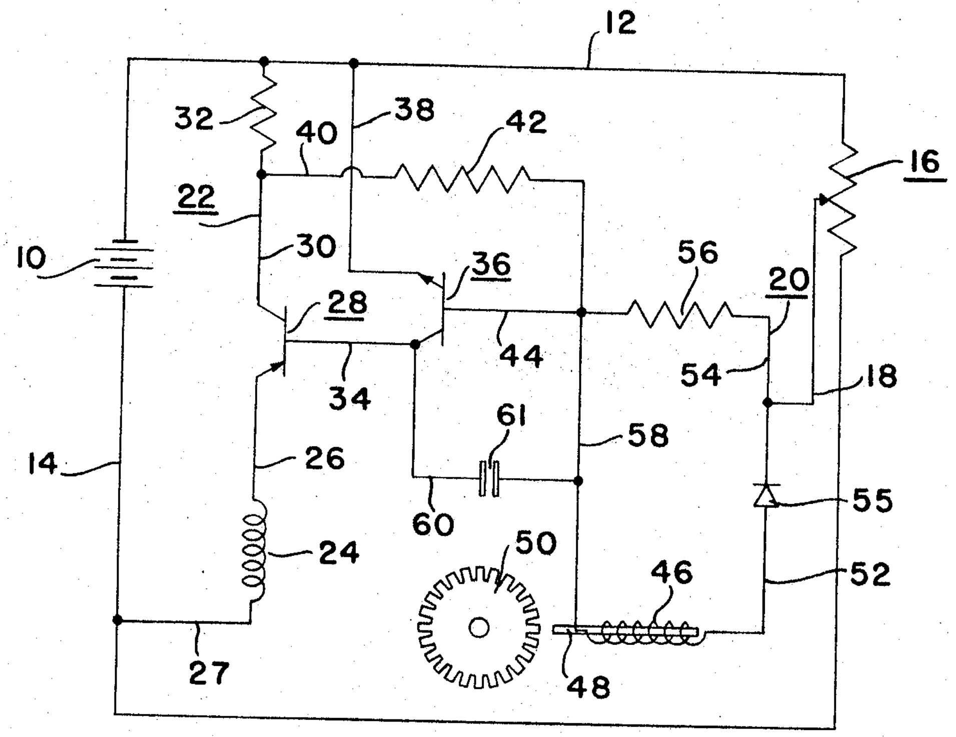
INVENTOR.
Homer W. Deaton
BY J. C. Evans
His Attorney United States Patent Office 3,447,007
Patented May 27, 1969

3,447,007
TRANSISTORIZED ELECTRICAL CONTROL CIRCUIT

Homer W. Deaton, Centerville, Ohio, assignor to General Motors Corporation, Detroit, Mich., a corporation of Delaware Filed Dec. 2, 1965, Ser. No. 511,099
Int. Cl. H02p *5/16*
U.S. Cl. 310—95 8 Claims

ABSTRACT OF THE DISCLOSURE

In preferred form, a current controlling, transistorized, electrical control circuit including a tachometer generator producing a pulsating control signal that is connected to the base of a control transistor. A D.C. reference voltage also is connected to the base of the control transistor. The generated voltage and D.C. voltage control conductivity of the control transistor and a coupled power transistor for varying current through an energized load. A voltage divider is connected between the base of the control transistor and the collector of the power transistor for improving responsiveness of the coupled transistors. A capacitor is connected across the collector and base of the control transistor to eliminate voltage peaks in the tachometer generated signal without delaying the responsiveness of the coupled transistor pair in response to changes in the generated tachometer voltage.

This invention relates to electrical control circuits and more particularly to electrical control circuits having current modulating transistors for varying the energization of an electrical load.

In electrical control systems for varying the energization of the electrical load in response to changes in operative conditions in a system, often it is desirable that the load energization be changed immediately following the change in operative conditions without any appreciable time delay.

An object of the present invention is to improve the control of the energization of an electrical load in response to changes in sensed conditions by the provision of a pair of coupled transistors wherein one of the transistors modulates the current flow through the electric load in response to the control of the other transistor in the pair that receives an input signal of a condition of operation of a device including the electrically energizable load and wherein voltage divider means are included in the energization circuit through said one transistor for proportionally directing a part of the current flow through the energization circuit of the load back to the base of the other transistor to improve the gain characteristics of the pair of transistors in response to the input signal impressed thereon.

A further object of the present invention is to improve the control of the energization of an electrical load by the provision of an electrical circuit including a first power transistor having its input and output terminals adapted to be electrically connected across a power supply and a second control transistor having one of its input and output terminals electrically connected to the base of the power transistor and the other of its input and output terminals adapted to be connected to the power supply and further including a base that receives a first control signal biased out by a second pulsing signal that varies in accordance with a condition of operation of a device in which the load is located and wherein said circuit includes means for filtering out the effect of the pulsing signal on the control transistor without appreciably delaying the biasing effect of the pulsing signal on the control signal.

A still further object of the present invention is to improve the control of the energization of an electrical load by the provision of a transistorized circuit including a first transistor having the input and output terminals thereof adapted to be electrically connected across a source of power for modulating the power supply to the energized load and wherein a control transistor is provided having one of its input and output terminals connected to the base of the power transistor and the other of its input and output terminals adapted to be connected to the power source, and wherein an input signal circuit directs a first predetermined control signal on the base of the control transistor and a pulsing signal thereon that bucks out the effect of the control signal on the base of the control transistor and wherein a capacitor feedback circuit is electrically connected between one of the terminals and the base of the control transistor to nullify the effect of the pulsing signal on the control transistor without delaying the response of the control transistor to changes in the pulsing signal.

Still another object of the present invention is to improve control systems of the type set forth in the preceding object wherein voltage divider means are included between the power source and one of the terminals of the power transistor for proportionally directing a part of the current flow through the power transistor to the base of the control transistor to amplify the effect of the voltage differential between the control signal and the pulsing signal on the control transistor.

Further objects and advantages of the present invention will be apparent from the following description, reference being had to the accompanying drawings wherein a preferred embodiment of the present invention is clearly shown.

The drawing is a diagrammatic showing of an electrical circuit including the improved electrical control system of the present invention.

More specifically, in the drawing the improved electrical control system includes a power source 10, representatively shown as being a source of D.C. voltage that is electrically connected by conductors 12, 14 to an input circuit including a variable resistance 16 that establishes a first predetermined potential on an input terminal 18 to an input signal circuit 20. The input signal circuit 20 varies the current flow through a load energization circuit 22 that is illustrated as including an electrical load 24 shown as a coil, for example, the coil of a magnetically controlled slip clutch in the drive system of a domestic clothes washer as set forth in United States Patent No. 3,328,983, issued July 4, 1967, to Brucken et al. The load 24 has one end thereof electrically connected by a conductor 27 to the conductor 14 and the other end thereof electrically connected by a conductor 26 to one terminal of a power transistor 28 which is shown representatively as being a pnp transistor. The other terminal of the transistor 28 is electrically connected by a conductor 30 through a resistance 32 to the conductor 12.

The power transistor 28 has the base thereof electrically connected by a conductor 34 to one terminal of a control transistor 36 which is shown representatively as being an npn transistor. The other terminal of the control transistor 36 is connected by a conductor 38 to the conductor 12.

The control system further includes an electrical connection between the power transistor 28 and the control transistor 36 that includes a conductor 40 that connects a resistance 42 between the conductor 30 and a conductor 44 that is connected electrically to the base of the control transistor 36.

The input signal circuit 20, in addition to the input terminal 18, has a pulsing signal input represented by a coil 46 that has a permanent magnet member 48 directed therethrough that is located in close spaced relationship with a rotatable toothed wheel 50 that is driven by an operative component of a machine of whicn coil 24 forms a part to produce a pulsing induced voltage in the coil 46. The coil 46 has one end thereof electrically connected by a conductor 52 through a diode 55 thence through a conductor 54 which is electrically connected to the input terminal 18 and a resistance 56. The opposite end of the coil 46 is connected electrically to the other side of the resistance 56 by a conductor 58. The induced voltage in the coil 46 thereby is impressed as an A.C. half-wave form to bias against the the input signal on the terminal 18. The resultant voltage is directed from the input circuit 20 through the conductor 44 to the base of the control transistor 36.

The circuit further includes a capacitive feedback loop 60 having a capacitor 61 therein electrically connected between the collector of the illustrated control transistor 36 and the base thereof.

The illustrated arrangement is operated by setting the variable resistance 16 at a predetermined value to establish a first D.C. potential on the terminal 18. This potential will condition the control transistor 36 to cause current flow between the collector and emitter thereof whereby the power transistor 28 will have a predetermined conductivity between the emitter and collector thereof to produce a first predetermined energization of the coil 24 which, in the case of the representatively referred to domestic washing machine, will cause a rotation of the slip clutch that will drive the toothed wheel 50 to induce a voltage in the coil 46 to balance against the control potential at the terminal 18 whereby the conductivity of the transistor 36 is reduced across the collector and emitter thereof to cause a commensurate drop in the conductivity of the transistor 36 and a resultant change in the potential across the terminals of the transistor 28 to vary thereby the energization of the load represented by the coil 24 in the illustrated arrangement.

The response of the transistor pair 28, 36 to a predetermined differential in the input signal at 18 and the voltage induced in the coil 46 is improved in the illustrated arrangement by the provision of a voltage divider represented by the resistances 32, 42. When the transistor 36 has a maximum differential signal directed to the base thereof through the conductor 44, the control transistor 36 will condition the power transistor 28 to produce a predetermined maximum output signal therefrom that will produce current flow from the power source 10 through conductor 26, the load represented by the coil 24, the conductor 26 through the emitter of the power transister 28 thence through the collector thereof and through conductor 30 and resistance 32 back to conductor 12 and the battery 10. The resistance 32 produces a voltage differential across the resistance 42 that proportionally directs a part of the current flow through the load energization circuit to the base of the control transistor 36 to further increase the conductivity therein to cause an increase in conductivity in power transistor 28 whereby the load 24 is brought quickly up to a full energization state.

As the input signal 18 is balanced by the voltage induced in the coil 46 the control transistor 36 is conditioned to produce a voltage across the collector and emitter thereof that will quickly condition the transistor 28 to produce a voltage between the emitter and collector thereof that will rapidly reduce the energization of the load represented by the coil 24.

Another feature of the illustrated arrangement is that the pulsing voltage induced in the signal circuit 20 by the coil 46 is effectively filtered from the transistor 36 by the provision of the capacitor 61 connected between the collector and base thereof. The pulsing signal otherwise will produce a peak voltage level at the transistor 36 that will cause a commensurate increase in the voltage on the base of the transistor 28 that will damage the transistor 28. In the past, to filter the peaks of such pulsing voltage from a transistorized control circuit, a transistor has been connected across the pulsing circuit as, for example, by connecting a capacitor across the resistance 56 between the conductors 54 and 58. In such an arrangement the capacitive circuit has a time constant that, in many cases, will delay the response of the transistorized control to changes in the induced voltage whereby the changes in the current flow through the energization circuit are delayed to an extent that the changes in the operative condition as, for example, the reduced speed of the toothed wheel 50, will not be rapidly compensated. The connection of the capacitor 61 across the collector and base of the control transistor 36 eliminates the time delay in the control circuit while eliminating the effect of the half-way A.C. pulse on the control transistor 36. In the illustrated arrangement, the capacitor 61 produces a degenerate feedback of A.C. pulses from the collector of the control transistor 36 to the base thereof whereby the A.C. pulses in the circuit are balanced across the transistor 36 and thereby nullified. The elimination of the A.C. pulses in the circuit by the improved arrangement does not affect the response of the transistor 36 to changes in the D.C. component of the voltage induced in the coil 46 that bucks against the input voltage through the conductor 18 whereby the transistor 36 and the conditioned power transistor 28 are responsive immediately to changes in the differential voltage between the signal at conductor 18 and that induced in the coil 46. As a result, the circuit is responsive immediately to changes in sensed conditions in a device associated with the energized load as, for example, the speed of the clutch in the aforementioned application that effects the speed of a toothed wheel element 50.

More specifically, to maintain a predetermined washer speed control, as the speed of the toothed wheel 50 is changed, as for example, by changes in the loading on the clutch that occur normally in the operation of clothes washing apparatus, the energization circuit of the coil 24 is conditioned immediately to correct the slowdown of speed or the increase thereof whereby a closely regulated washer speed is obtained over wide ranges of operating conditions.

From the above-described description of the invention, it will be appreciated by those skilled in the art that the system is an improved electrical controller that will respond quickly to changes in input signals to vary an output signal suitable for quickly controlling the energization of an electrical load. More specifically, the improved system has a transistorized power supply with an improved effective gain from the input to the output thereof as well as the provision therein of an improved feedback between the base and one of the terminals of a control transistor that will eliminate a lag between changes in sensed conditions and a change in load energization to correct for the changes in the sensed conditions where a pulsing control signal is used to condition the control transistor.

While the embodiment of the present invention as herein disclosed constitutes a preferred form, it is to be understood that other forms might be adopted.

What is claimed is as follows:

1. In an electrical control circuit for modulating the energization of an electrical load, the combination of, circuit means including a power transistor having its input and output terminals adapted to be connected across a power source, means for electrically connecting the load between said power transistor and said power source, a control transistor having an input terminal and an output terminal one of said terminals being connected to the base of said power transistor, the other of said terminals being adapted to be connected to said power source, means for directing a first control signal to the base of said control transistor for varying the conductivity of said control transistor to vary the conductivity of said power transistor, a first resistance electrically connected between the load and one of the terminals of said power transistor, a second resistance electrically connected between said one terminal of said power transistor and said first resistance and the base of said control transistor, said first and second resistances serving to proportion current flow through the input and output terminals of said power transistor to the base of said control transistor to increase current flow between the input and output terminals of said control transistor to amplify the effective gain of said control transistor to produce a progressively accelerated level of conductivity in said power transistor.

2. In the combination of claim 1, signal circuit means for directing a pulsing control signal to bias out said first control signal and means for filtering the pulsing signal from the base of said control transistor without delaying the biasing action of said pulsing signal in said electrical control circuit.

3. In the combination of claim 2, said means for filtering the pulsing signal including a capacitor connected directly between the base of said control transistor and one of the input and output terminals thereof to produce a feedback of the pulsing signal between the base of said control transistor and one of its terminals to nullify the effect of the pulsing signal on the controlling action of said control transistor.

4. In the combination of claim 3, said circuit further including voltage divider means electrically connected between said first transistor and said power source for proportioning current flow through the input and output terminals of said first transistor to produce a progressive increase in the conductivity of said first transistor by varying the conductivity of said second transistor.

5. An electrical control circuit for modulating the energization of an electrical load comprising, means including a power transistor for electrically connecting the load across a power source, circuit means including a control transistor for varying the conductivity of said power transistor, signal circuit means for directing a pulsing control signal to the base of said control transistor to vary the conductivity thereof, and means for filtering said pulsing control signal from the base of said power transistor without delaying the biasing action of said pulsing signal on the base of said control transistor, said means for filtering the pulses of said pulsing control signal including a capacitor connected directly between the base of said control transistor and the collector of said control transistor to balance the peak of the pulsing signal across the collector and base of said control transistor to nullify the effect thereof on said control transistor.

6. An electrical control circuit for modulating the energization of an electrical load comprising, means including a power transistor for electrically connecting the load across a power source, circuit means including a control transistor for varying the conductivity of said power transistor, signal circuit means for directing a pulsing control signal to the base of said control transistor to vary the conductivity thereof, and means for filtering said pulsing control signal from the base of said power transistor without delaying the biasing action of said pulsing signal on the base of said control transistor, said circuit means including voltage divider means for proportionally directing current flow through the input and output terminals of said power transistor to the base of said control transistor to increase current flow between the input and output terminals of said control transistor whereby the effective gain of said control and power transistors is magnified, said means for filtering the pulsing signal from the base of said control transistor including a capacitor connected directly between the base of said control transistor and the collector of said control transistor to produce a feedback of signal pulses in the collector to the base of said control transistor whereby the peaks in the pulsing signal are nullified across said control transistor whereby said control transistor is responsive to said pulsing control signal without any appreciable delay.

7. An electrical control circuit for modulating the energization of an electrical load comprising, means including a power transistor for electrically connecting the load across a power source, circuit means including a control transistor for varying the conductivity of said power transistor, signal circuit means for directing a pulsing control signal to the base of said control transistor to vary the conductivity thereof, and means for filtering said pulsing control signal from the base of said power transistor without delaying the biasing action of said pulsing signal on the base of said control transistor, said signal circuit means including means for directing a first D.C. control signal to the base of said control transistor to produce a predetermined conductivity in said power transistor, said signal circuit means including tachometer generator means for directing a pulsing control signal to bias out said first control signal, said means for filtering the pulses of said pulsing control signal including a capacitor connected directly between the base of said control transistor and the collector of said control transistor to produce a feedback of signal pulses in the collector to the base of said control transistor to balance the peak of the pulsing signal across the collector and base of said control transistor thereby to nullify the effect thereof on said control transistor.

8. An electrical control circuit for modulating the energization of an electrical load comprising, a power source, an electrical load, circuit means including a first transistor having input and output terminals connected across said power source, means for electrically connecting said electrical load in power supply relationship with said first transistor, a second transistor having input and output terminals electrically connected between the base of said first transistor and the power source, toothed wheel means, permanent magnet pickup means located in close spaced relationship to said toothed wheel means, means including a coil having a pulsing voltage induced therein in response to movement of said toothed wheel means with respect to said permanent magnet, circuit means including a diode electrically connected between said coil and the base of said second transistor for directing a pulsing signal thereagainst, means for directing a control potential on said base, said pulsing signal biasing said control potential to nullify the effect thereof on the base of said second transistor, and means for filtering the pulsing signal from said circuit means to the base of said second transistor without delaying the response of said second transistor to changes in said pulsing signal, said means for filtering the pulsing signal including a capacitor connected directly between the base of said second transistor and one of the terminals thereof to produce a degenerative feedback of the pulses from said one terminal to the base of said second transistor to nullify the effect of said pulsing signal on said second transistor.

References Cited

UNITED STATES PATENTS

| | | | |
|---|---|---|---|
| 2,967,991 | 1/1961 | Deuitch | 323—22 |
| 3,207,950 | 9/1965 | Smith | 310—95 |

ORIS L. RADER, *Primary Examiner.*

G. NUNEZ, *Assistant Examiner.*

U.S. Cl. X.R.

318—328; 323—22